(12) United States Patent
Lin et al.

(10) Patent No.: US 7,202,903 B2
(45) Date of Patent: Apr. 10, 2007

(54) CLIPPING DOCK FOR NETWORK VIDEO CAMERAS

(75) Inventors: Yu-Eou Lin, Taipei (TW); Jin-Shing Shr, Taipei (TW)

(73) Assignee: Inventec Multimedia & Telecom Corporation, Taipei (TW)

( * ) Notice: Subject to any disclaimer, the term of this patent is extended or adjusted under 35 U.S.C. 154(b) by 769 days.

(21) Appl. No.: 10/669,459

(22) Filed: Sep. 25, 2003

(65) Prior Publication Data

US 2005/0068461 A1 Mar. 31, 2005

(51) Int. Cl.
*H04N 5/225* (2006.01)
*G03B 17/00* (2006.01)
*F16M 11/00* (2006.01)
*F16M 13/02* (2006.01)

(52) U.S. Cl. ............... 348/373; 348/376; 396/419; 396/428; 248/177.1; 248/689

(58) Field of Classification Search ........... 348/373; 248/689, 510, 183.3; 396/428
See application file for complete search history.

(56) References Cited

U.S. PATENT DOCUMENTS 5,855,343 A * 1/1999 Krekelberg ............... 248/121
D411,220 S * 6/1999 Surabian .................. D16/242
6,663,066 B1 * 12/2003 Hong ...................... 248/231.41

* cited by examiner

*Primary Examiner*—David Ometz
*Assistant Examiner*—Wanda M. Negrón
(74) *Attorney, Agent, or Firm*—Birch, Stewart, Kolasch & Birch, LLP

(57) ABSTRACT

A clipping dock for network video cameras includes a primary clip rod, a secondary clip rod, a torsional spring, an actuating button and a cap. The secondary clip rod is stacked on the primary clip rod. The torsional spring is mounted onto the stacked location to enable the primary clip rod and the secondary clip rod to extend or fold elastically relative to each other. The secondary clip rod has ratchet teeth at the stacked location to engage with the actuating button located nearby. The cap covers the stacked location. When the primary clip rod and the secondary clip rod are extended or folded at a desired angle, the actuating button may be moved to engage with the ratchet teeth to form an anchor condition to thereby achieve a self-adjusting function for extending or folding.

6 Claims, 9 Drawing Sheets

CLIPPING DOCK FOR NETWORK VIDEO CAMERAS

BACKGROUND OF THE INVENTION

1. Field of Invention

The invention relates to a clipping dock for network video cameras and particularly to a clipping dock that is capable of self adjusting extending and clipping angles.

2. Related Art

With the growing popularity of the broadband network, more and more network users communicate with remote parties through various computer peripheral devices such as audio and video equipment. The most commonly used equipment includes microphones and sound adapter cards to transmit audio signals and network video cameras to capture the user's image for video transmission.

These days teleconferencing is also widely adopted. A variety of network video cameras are available on the market. Most network video cameras have a base dock which includes a means for adjusting leftwards and rightwards, or upwards and downwards. Such a base dock can only be used on a flat surface and takes a lot of space.

In addition, mobile communication has become a fashionable working style for many people nowadays. They often carry a notebook computer and work wherever they go whenever they want. When there is a need for video communication, the flat working space is not always available. For instance, in a situation where a user works on a laptop computer, using a network video camera becomes a problem.

SUMMARY OF THE INVENTION

In view of the aforesaid disadvantages, the object of the invention is to provide a clipping dock for network video cameras that can clip on a flat LCD display such as an LCD panel, notebook computer panel, or the like.

The clipping dock for network video cameras according to the invention includes a primary clip rod, a secondary clip rod, a torsional spring, an actuating button and a cap. The secondary clip rod is stacked on and coupled with the primary clip rod. The torsional spring is mounted onto the stacked location to enable the primary clip rod and the secondary clip rod to extend or clip elastically. The secondary clip rod has ratchet teeth on the stacked location to engage with the actuating button located on the primary clip rod. The cap covers the stacked location. When the primary clip rod and the secondary clip rod are extended to a desired angle, the actuating button may be moved to engage with the ratchet teeth to form an anchor condition. By contrast, the actuating button may also be moved to disengage with the ratchet teeth. Then the torsional spring forces the primary clip rod and the secondary rod folding towards each other. Thus a self-adjusting function may be achieved to extend or fold to a desired angle.

The invention may be used on flat display devices such as LCD panels of desktop computers or notebook computers to overcome space constraints. The clip rods may also be extended to a maximum range and placed steadily on a flat surface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
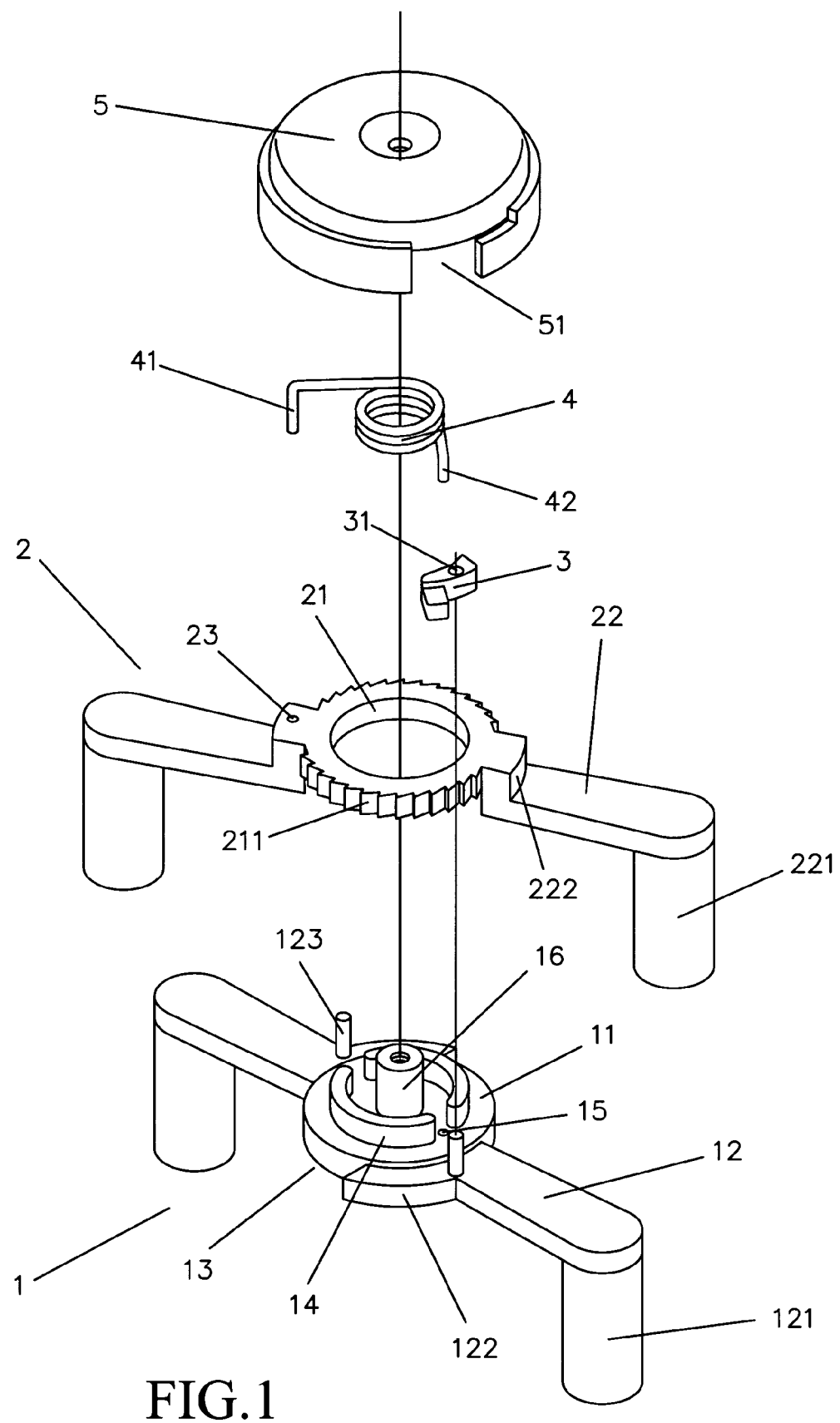
FIG. 1 is an exploded view of the invention.

Referring to FIG. 1, the clipping dock for network video cameras of the invention includes a primary clip rod 1, a secondary clip rod 2, an actuating button 3, a torsional spring 4, and a cap 5.

The primary clip rod 1 has a base disk 11 which has a pair of first clip arms 12 spaced from each other at 180 degrees. The first clip arm 12 has one end attached to a first clip strut 121, which is covered by a layer of rubber to increase the friction force during clipping. The first clip arm 12 and the base disk 11 are joined at a juncture that is integrally extended to form an arched block member 122. The block member 122 connects to the peripheral rim of the base disk 11. The two block members 122 oppose each other in a diagonal manner. The remaining portion of the base disk 11 that does not connect to the block member 122 forms a swivel space 13. The integrated juncture of the first clip arm 12 and the block member 122 has a stub shaft 123.

The base disk 11 has two arched guiding ribs 14 located in the center spaced by a pair of anchor notches 15, and a shaft 16 extending from the center.

The secondary clip rod 2 has a coupling ring 21, which has a pair of second clip arms 22 opposing each other at 180 degrees. The second clip arm 22 has one end attached to a second clip strut 221, which is covered by a layer of rubber to increase the friction force during clipping. The second clip arm 22 and the coupling ring 21 are joined at a juncture that forms a stepped latch member 222. One of the latch members 222 has a latch hole 23.

Figure 2:
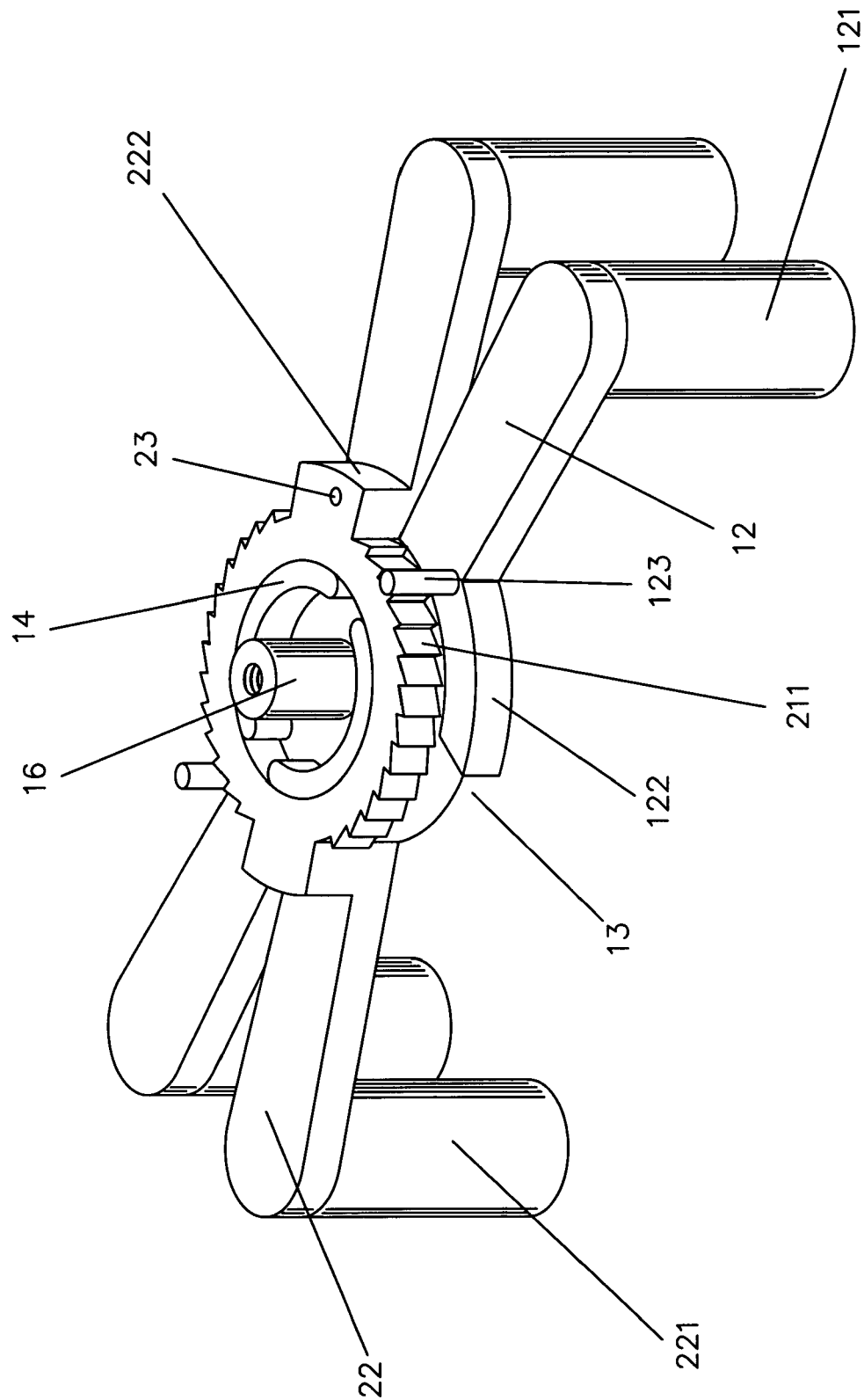
FIG. 2 is a schematic view of the invention with the secondary clip rod and the primary clip rod in a folding condition.
Figure 3:
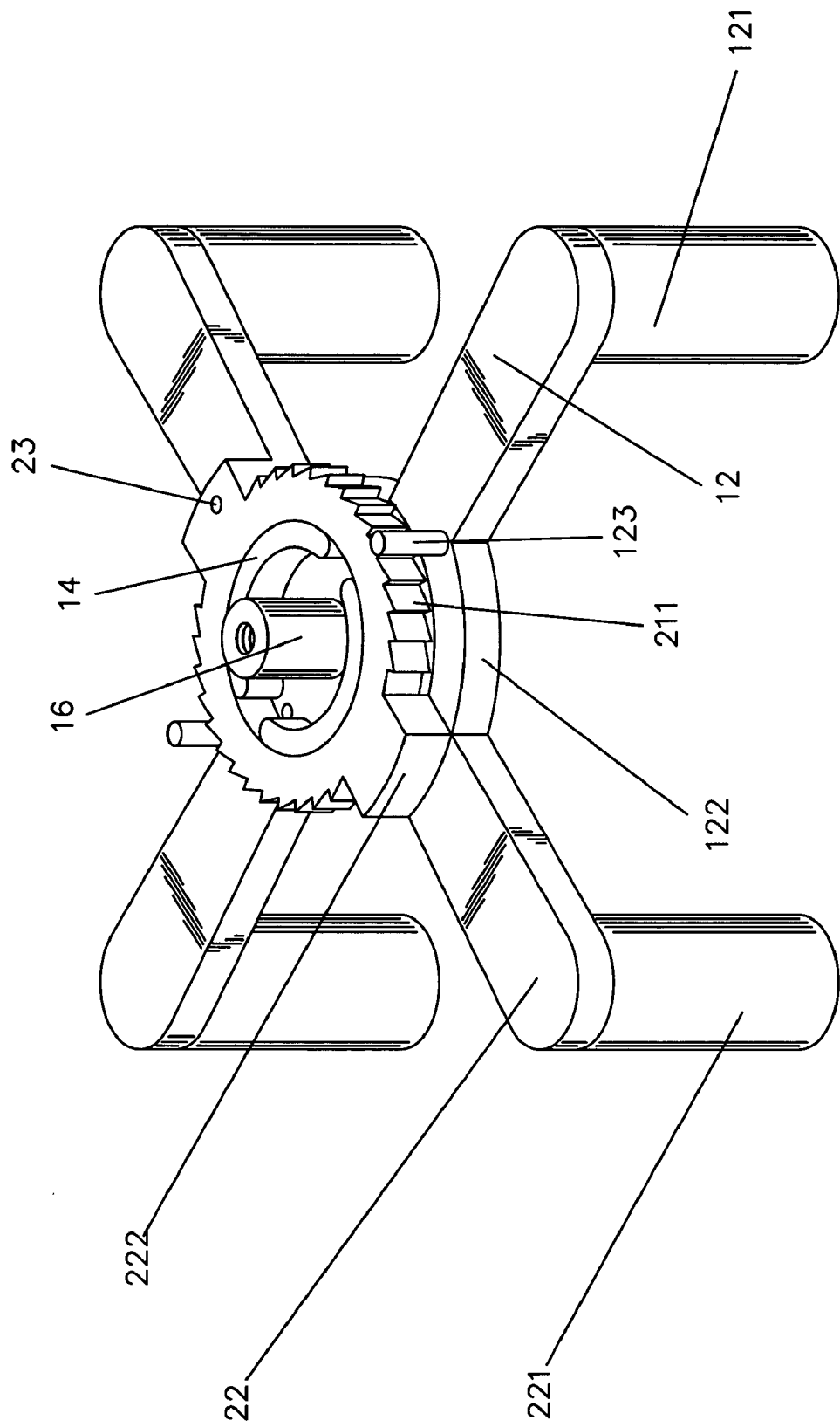
FIG. 3 is a schematic view of the invention with the secondary clip rod and the primary clip rod in an extending condition.

Referring to FIGS. 2 and 3, the coupling ring 21 is coupled on the guiding ribs 14 of the primary clip rod 1 to enable the secondary clip rod 2 to stack on the primary clip rod 1 and to turn relative to it so that the first clip strut 121 and the second clip strut 221 may be folded or extended. The folding and extending range is limited by the swivel space 13. That is, the stepped latch member 222 of the secondary clip rod 2 may be turned only within the swivel space 13. When the first clip strut 121 and the second clip strut 221 are extended as much as possible, the latch member 222 bucks against the block member 122 of the primary clip rod 1. In the folding condition, the latch member 222 bucks against the first clip strut arm 12 of the primary clip rod 1. Moreover, after the secondary clip rod 2 stacks on the primary clip rod 1, the latch hole 23 of the secondary clip strut 2 forms a diagonal relationship with the anchor notch 15 of the primary clip rod 1.

Figure 4:
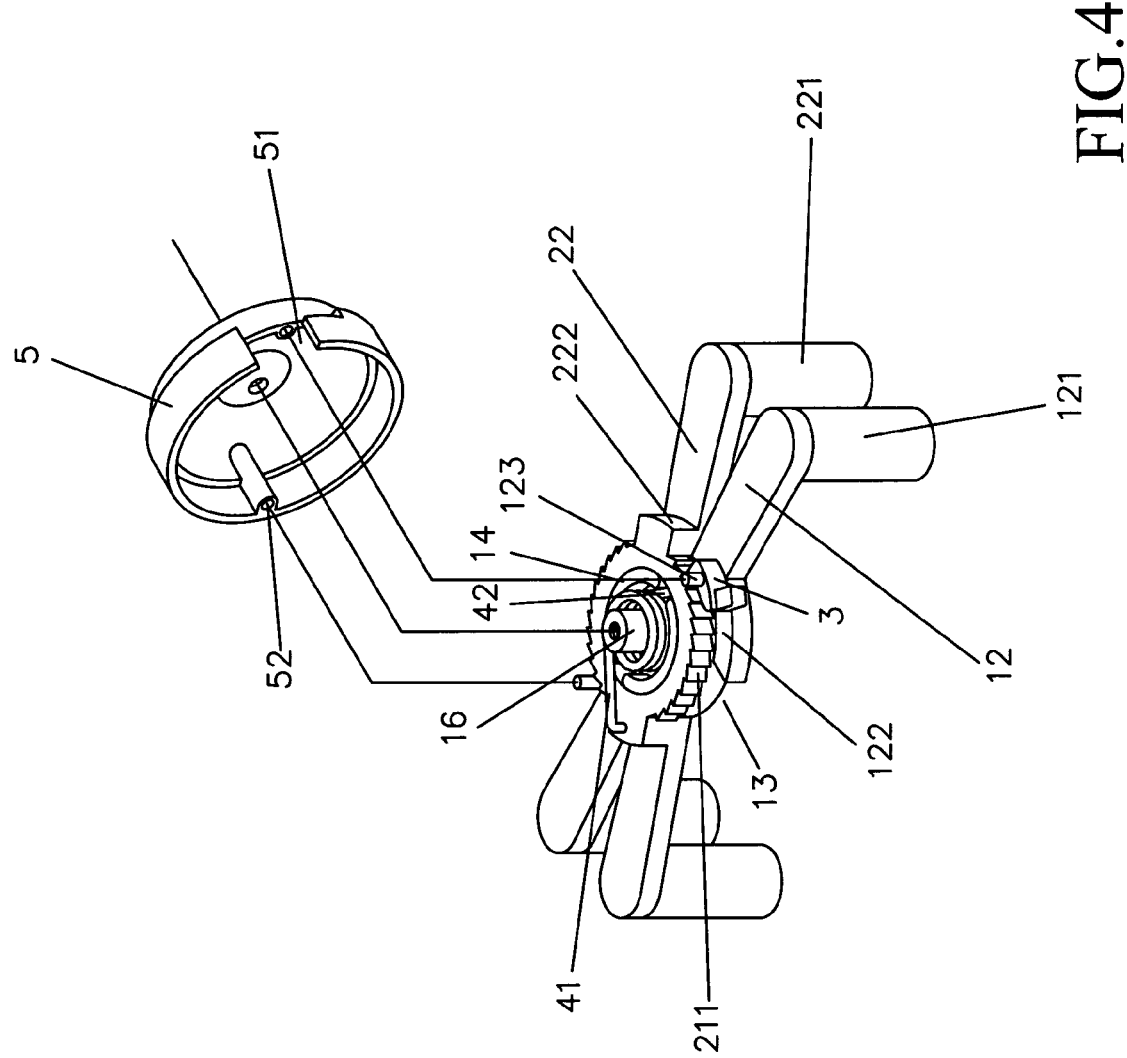
FIG. 4 is a fragmentary exploded view of the invention.

The coupling ring 21 has ratchet teeth 211 formed on the peripheral surface. Referring to FIG. 4, when the secondary clip rod 2 stacks on the primary clip rod 1 and forms a foldable and extendable structure, the actuating button 3 that has a coupling hole 31 may be coupled on one stub shaft 123 to engage with the ratchet teeth 211.

The torsional spring 4 has a top side extending to form a long arm 41 and a bottom side extending to form a short arm 42. The torsional spring 4 is coupled on the shaft 16 of the primary clip rod 1 after the secondary clip rod 2 has been stacked on the primary clip rod 1. The long arm 41 is engaged with the latch hole 23 of the secondary clip rod 2, while the short arm 42 is engaged with the anchor notch 15 of the primary clip rod 1 so that the primary clip rod 1 and the secondary clip rod 2 may have a torsional force for folding and extending.

The cap 5 covers the coupling portion of the coupling ring 21 and the guiding ribs 14 to prevent the torsional spring 4 from escaping from the shaft 16 during repetitive operation. The cap has a trigger notch 51 on the peripheral rim and a pair of insert holes 52 in the interior to couple with the stub shafts 123 when the cap 5 is mounted. The trigger notch 51 is coupled with the actuating button 3.

Figure 5:
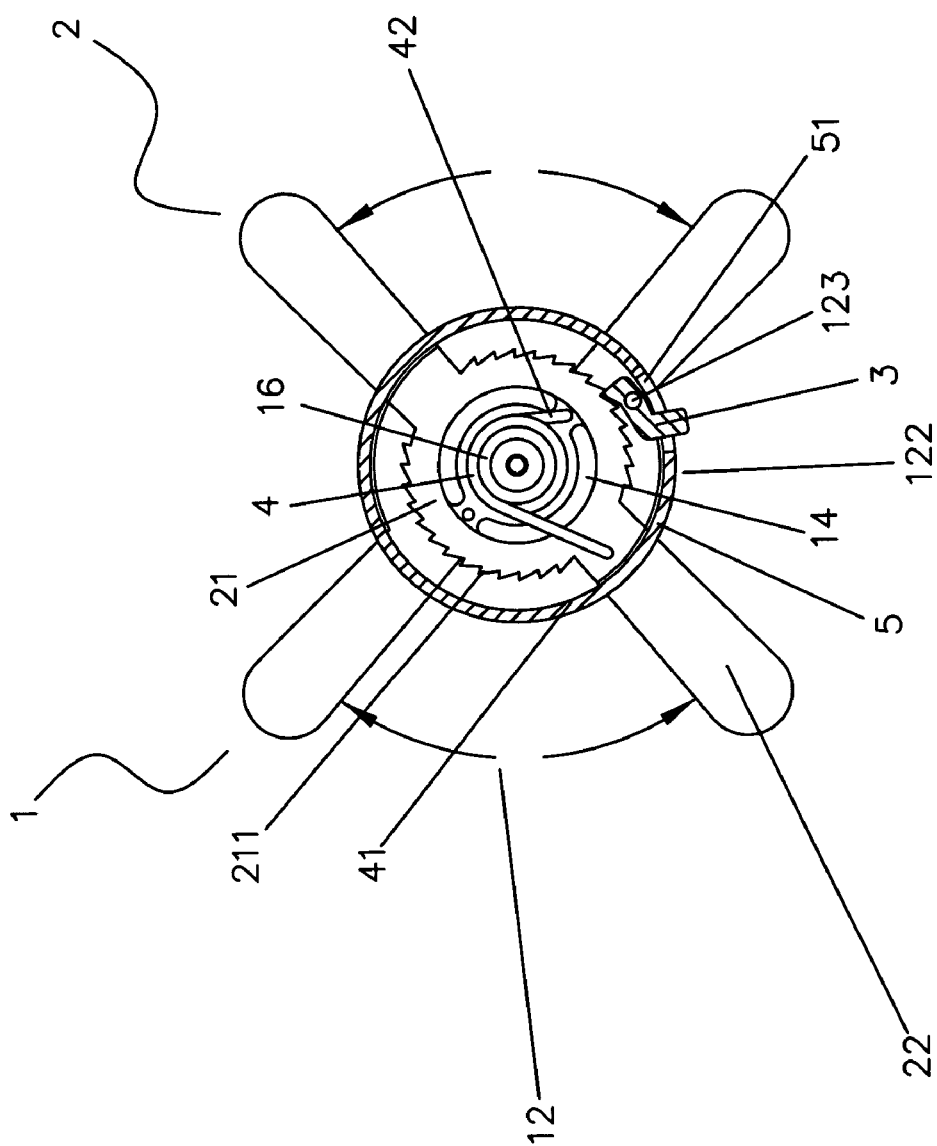
FIG. 5 is a sectional view of the invention in an extending condition.
Figure 6:
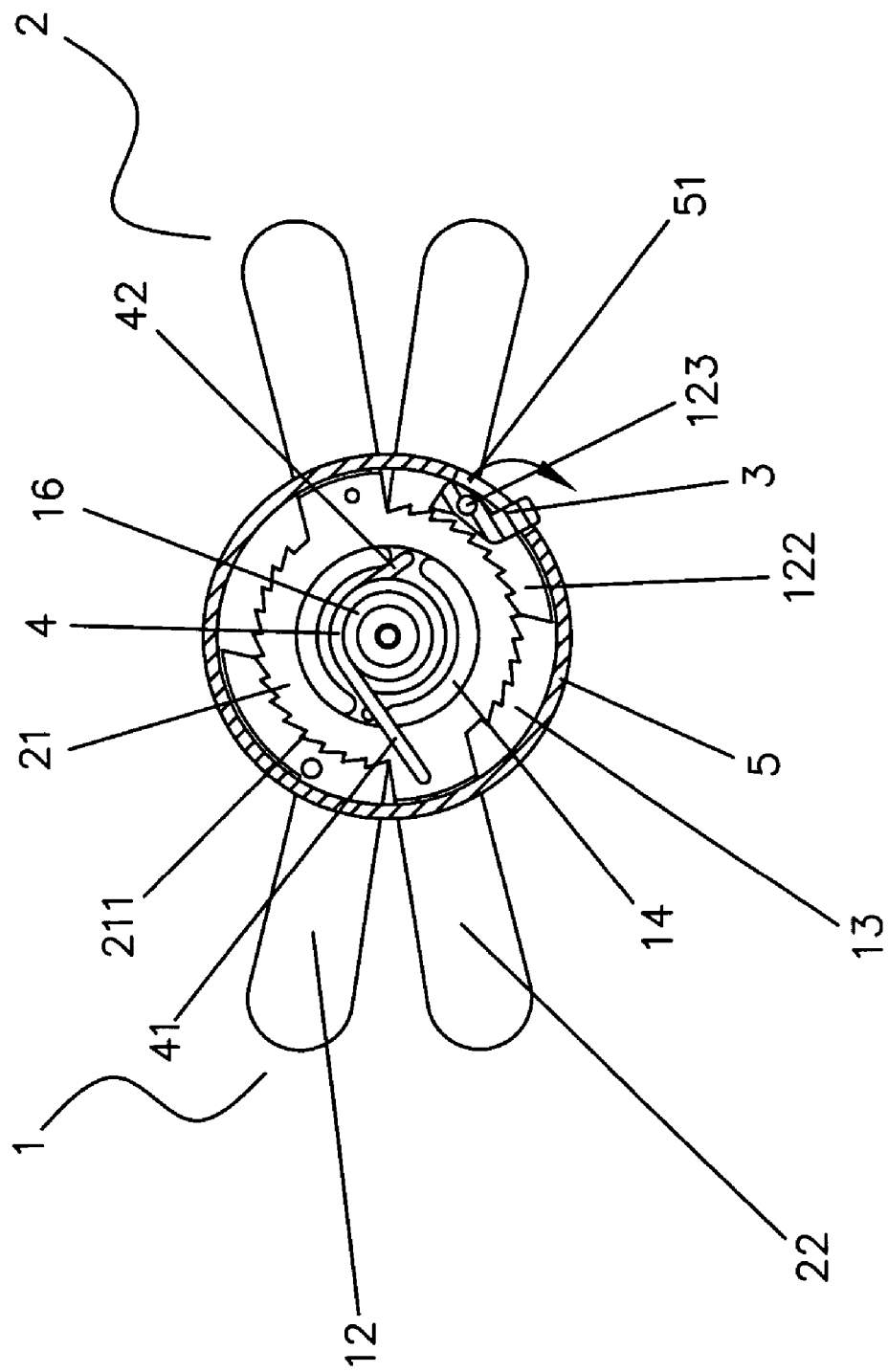
FIG. 6 is a sectional view of the invention in another extending condition.

Referring to FIGS. 5 and 6, when the primary clip rod 1 and the secondary clip rod 2 are extended, the ratchet teeth 211 are turned counterclockwise. Meanwhile, the actuating button 3 is separated from the ratchet teeth 211 when the ratchet teeth are turned (indicated by the arrow in the drawings). Thus the actuating button 3 does not stop the ratchet teeth 211. When the primary clip rod I and the secondary clip rod 2 are extended to a desired angle, the actuating button 3 may be moved to latch on the ratchet teeth 211 to anchor the primary clip rod 1 and the secondary clip rod 2 at the desired angle.

On the other hand, after the actuating button 3 escapes the ratchet teeth 211 and the ratchet teeth 211 are not longer latched, the reaction force of the torsional spring 4 pushes the primary clip rod I and the secondary clip rod 2 towards each other. Thus whether extending or folding, when anchoring at a selected angle, the actuating button 3 may be pushed to latch the ratchet teeth 211 to brake the clipping force of the torsional spring 3 exerted on the primary clip rod I and the secondary clip rod 2 to achieve the required anchoring.

Figure 7:
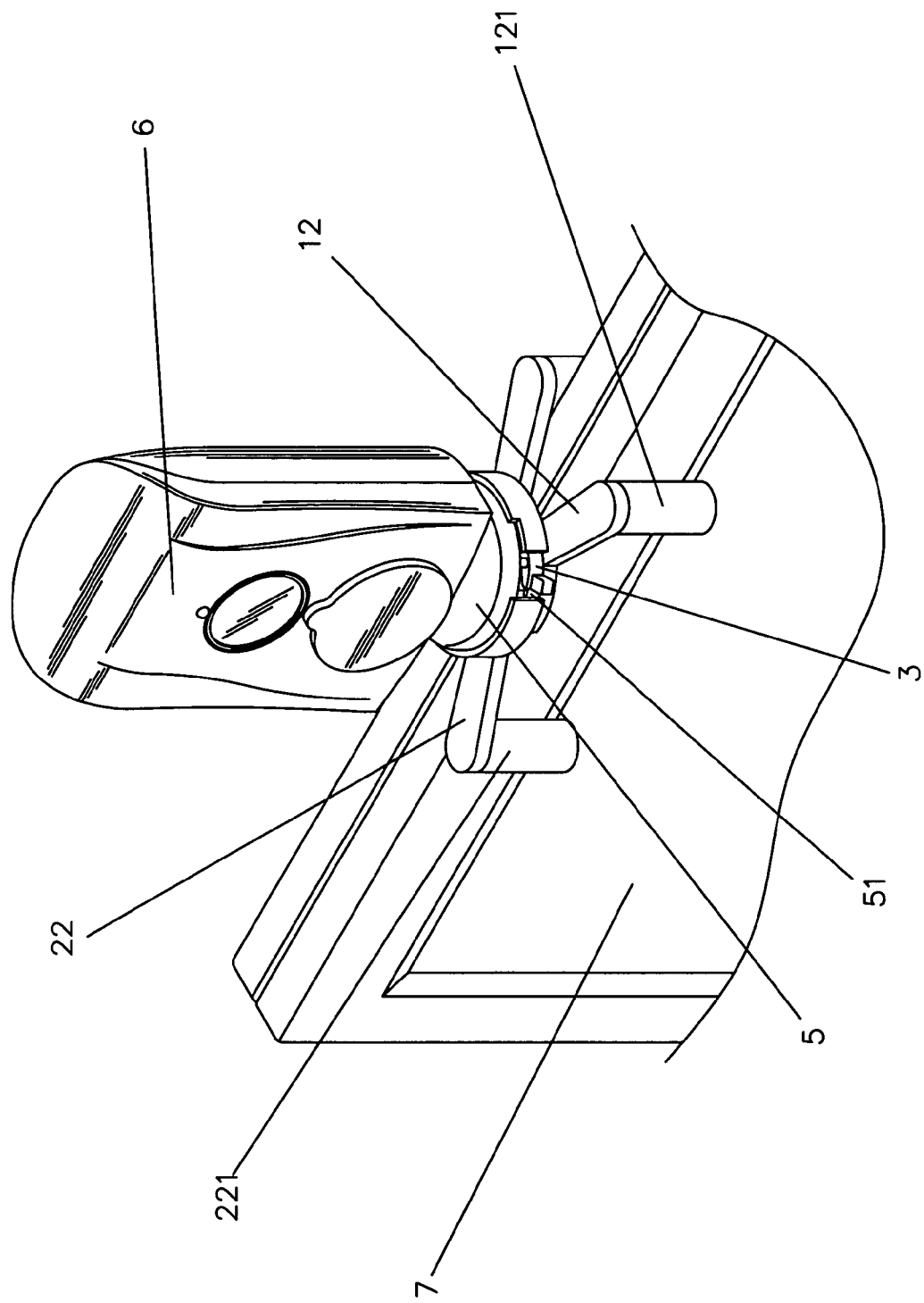
FIG. 7 is a pictorial view of the invention clipping on an LCD device.

Referring to FIG. 7, after a network video camera 6 has been mounted on the clipping dock, the primary clip rod I and the secondary clip rod 2 may be extended to the maximum range to straddle the frame edge of a clipping object (such as a display panel 7 of a desktop or notebook computer). Then the actuating button 3 may be released to enable the primary clip rod 1 and the secondary clip rod 2 to form a clipping state to anchor on the display panel 7.

Figure 8:
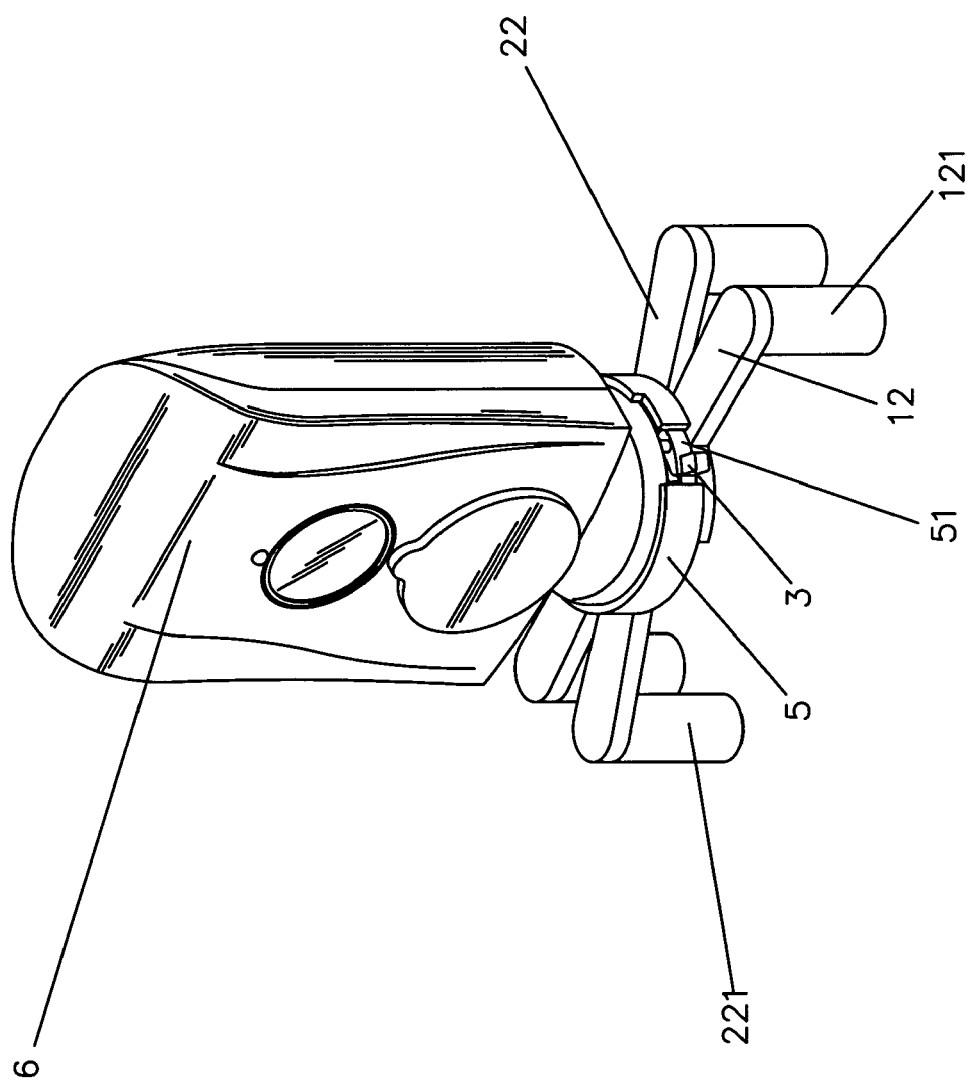
FIG. 8 is a pictorial view of the invention coupled with a network video camera and mounted onto a flat surface in a folding condition.
Figure 9:
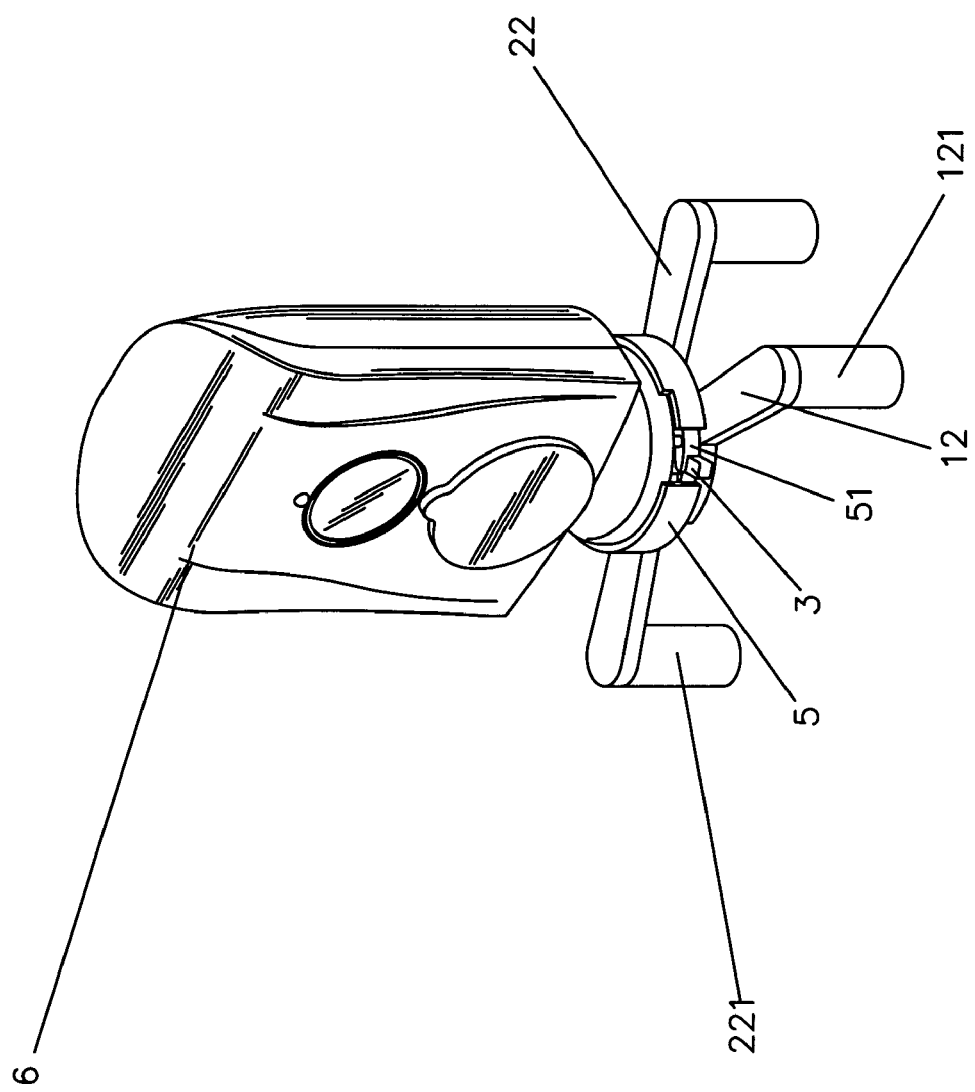
FIG. 9 is a pictorial view of the invention coupled with a network video camera and mounted onto a flat surface in an extending condition.

In addition, referring to FIGS. 8 and 9, when there is no need for the latch function between the ratchet teeth 211 and the actuating button 3 to clip the primary clip rod 1 and the secondary clip rod 2 on a object, but placing on a flat surface is desired, the folding of the primary clip rod 1 and the secondary clip rod 2 results in instability on the flat table. With the ratchet teeth 211 and the actuating button 3, the primary clip rod 1 and the secondary clip rod 2 may be extended to the maximum range, and the actuating button 3 may be moved to engage with the ratchet teeth 211 to form an anchor condition so that the first clip strut 121 and the second clip strut 221 may rest evenly on the flat surface to hold the whole object steadily without toppling.

By means of the aforesaid construction, it is clear that the clipping dock for network video cameras of the invention eliminates the problems occurring with the conventional clipping apparatus.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A clipping dock for network video cameras, comprising:
    a primary clip rod having a base disk which has a pair of first clip arms, a shaft extending from the center, and a guiding rib around the shaft, the first clip arm having one end attached to a first clip strut;
    a secondary clip rod having a coupling ring stacked on the base disk to couple on the guiding rib and a pair of second clip arms which have respectively one end attached to a second clip strut, the coupling ring having ratchet teeth formed on the peripheral surface thereof;
    a torsional spring coupled on the shaft at the stacked location between the secondary clip rod and the primary clip rod to allow the primary clip rod and the secondary clip rod to extend or fold elastically relative to each other; and
    an actuating button located on the primary clip rod to selectively engage with the ratchet teeth to allow the primary clip rod and the secondary clip rod to extend or fold at a selected angle.

2. The clipping dock for network video cameras of claim 1, wherein the base disk comprises a pair of stub shafts adjacent to the first clip arms, and the actuating button comprises a coupling hole to couple with one stub shaft for rocking thereon.

3. The clipping dock for network video cameras of claim 2, further comprising a cap which has insert holes formed on the interior corresponding to and coupling with the stub shafts, the cap being mounted on the stacked location of the primary clip rod and the secondary clip rod.

4. The clipping dock for network video cameras of claim 3, wherein the cap comprises a trigger notch on the peripheral rim to accommodate the actuating button.

5. The clipping dock for network video cameras of claim 1, wherein the base disk comprises an anchor notch to couple with a short arm extending from the torsional spring, and the coupling ring comprises a latch hole adjacent to the second clip arm to couple with a long arm extending from the torsional spring, the anchor notch and the latch hole being opposed each other to allow the primary clip rod and the secondary clip rod to extend or fold elastically relative to each other.

6. The clipping dock for network video cameras of claim 1, wherein the first clip strut and the second strut rod are covered by a rubber material to increase friction force during clipping.

* * * * *